United States Patent
Srivastava

(10) Patent No.: US 12,335,933 B2
(45) Date of Patent: Jun. 17, 2025

(54) SHARED USE OF WIRELESS SPECTRUM, CHANNEL MANAGEMENT, AND SEAMLESS CHANNEL CHANGE

(71) Applicant: Charter Communications Operating, LLC, St. Louis, MO (US)

(72) Inventor: Praveen C. Srivastava, Ashburn, VA (US)

(73) Assignee: Charter Communications Operating, LLC, St. Louis, MO (US)

( * ) Notice: Subject to any disclaimer, the term of this patent is extended or adjusted under 35 U.S.C. 154(b) by 336 days.

(21) Appl. No.: 17/870,020

(22) Filed: Jul. 21, 2022

(65) Prior Publication Data
US 2024/0032005 A1    Jan. 25, 2024

(51) Int. Cl.
H04W 72/04      (2023.01)
H04W 72/0453    (2023.01)
H04W 72/56      (2023.01)

(52) U.S. Cl.
CPC ....... H04W 72/0453 (2013.01); H04W 72/56 (2023.01)

(58) Field of Classification Search
CPC .... H04W 72/0453; H04W 72/56; H04L 5/001
See application file for complete search history.

(56) References Cited

U.S. PATENT DOCUMENTS

| | | | | |
|---|---|---|---|---|
| 2019/0313412 A1* | 10/2019 | Baldemair | ............ | H04L 5/0039 |
| 2021/0368379 A1* | 11/2021 | Xing | ................... | H04L 41/5067 |
| 2022/0232355 A1* | 7/2022 | Yang | ....................... | H04W 4/20 |
| 2022/0330224 A1* | 10/2022 | Ruder | .................... | H04W 72/02 |
| 2023/0119744 A1* | 4/2023 | Lin | ......................... | H04L 5/001 |
| | | | | 370/329 |

* cited by examiner

Primary Examiner — Jamal Javaid
(74) Attorney, Agent, or Firm — Armis IP Law, LLC

(57) ABSTRACT

A communication management resource controls operation of multiple wireless stations in a network environment. For example, the communication management resource receives allocation of first wireless bandwidth, the first wireless bandwidth including multiple wireless channels. The communication management hardware partitions the first wireless bandwidth into multiple selectable bandwidth part configurations. In one implementation, the first wireless bandwidth being partitioned with respect to channel boundaries associated with the multiple wireless channels. The communication management resource controls use of the bandwidth part configurations by multiple communication devices to provide wireless access to a remote network. In response to a condition in which a previously allocated wireless channel is no longer available based on use of the wireless channel by a higher priority user, the communication management resource implements a seamless switchover from a first bandwidth part configuration to a second bandwidth part configuration.

32 Claims, 14 Drawing Sheets

SHARED USE OF WIRELESS SPECTRUM, CHANNEL MANAGEMENT, AND SEAMLESS CHANNEL CHANGE

BACKGROUND

Conventional wireless networks include any of different types of communication devices supporting different wireless protocols. For example, two types of wireless networks support so-called LTE (Long Term Evolution) or NR (New Radio) communications in which user equipment is able to communicate with a base station (such an eNodeB, gNodeB, etc.) via use the LTE or NR protocol to access a respective network.

In certain instances, wireless stations such as those supporting LTE or NR share use of wireless spectrum with other entities. For example, the U.S. military/DoD (Department of Defense) and other federal agencies operate a broad swathe of land-based, sea-based, and airborne radar systems in the UHF (Ultra High Frequency) and SHF (Super High Frequency) bands between 300 MHz (MegaHertz) and 30 GHz (GigaHertz). Some of the frequency bands used to support military radar operations that also overlap with 5G NR bands are: 420-450 MHz, 902-928 MHz, 2900-3100 MHz, 3100-3650 MHz, and 5250-5900 MHz.

The CBRS band (3550-3700 MHz) considers military radar to be incumbent operations that are protected from interference due to mobile or fixed wireless PAL (Priority Access License) and GAA (General Authorized Access or lower-priority users) operations. So-called dynamic Protection Areas (DPAs) are defined areas in which the military may be operating systems that require protection from CBRS (Citizens Band Radio System) base station (such as a CBSD or Citizens Broadband Radio Service Device) emissions. The net effect is to introduce limits on how much aggregate in-band and out-of-band interference can be generated by CBSDs in the vicinity of DPAs.

If an incumbent (e.g., naval radars) starts using a channel, all CBRS operations implemented by wireless network service providers must vacate that channel within 5 minutes so as not to interfere with the higher priority user (i.e., incumbent entity). If a ship borne radar activity is detected in a channel in one of the Dynamic Protection Areas (DPAs), CBRS operation in that channel must be suspended on all CBSDs on the "move list" within 5 minutes of detection.

When wireless channel is lost such as because it is used by a higher priority entity, the spectrum access system may find and assign an alternate channel to the impacted CBSDs. This requires rebooting of the wireless system, resulting in loss of wireless connectivity to corresponding mobile communication devices relying on use of a wireless channel to communicate with a wireless base station and access a remote network.

BRIEF DESCRIPTION OF EMBODIMENTS

There are deficiencies associated with conventional techniques of providing wireless connectivity using wireless channels. For example, the existing method of moving wireless devices to different wireless channels such as due to incumbent activity in a tiered communications system is disruptive for cellular wireless deployments.

Embodiments herein include a novel approach of providing improved wireless services in a wireless network environment susceptible to bandwidth allocation changes. For example, in contrast to conventional techniques, embodiments herein provide wireless network service providers (such as CBRS operators) to maintain "seamless" CBRS operation upon loss of a channel due to incumbent activity.

More specifically, in one implementation, a communication management resource (such as associated with a first wireless network service provider) receives allocation of first wireless bandwidth. The first wireless bandwidth includes multiple wireless channels. The communication management resource partitions the first wireless bandwidth into multiple selectable bandwidth part configurations. For example, in one embodiment, the communication management resource or other suitable entity partitions the first wireless bandwidth with respect to channel boundaries associated with the multiple wireless channels. In one embodiment, a respective channel boundary is a demarcation between a first wireless channel and a second wireless channel. Based on the bandwidth part partitioning, the communication management resource then controls use of the selectable bandwidth part configurations by multiple communication devices to provide wireless access to a remote network.

Further embodiments herein include, via the communication management resource, providing notification of the different selectable bandwidth part configurations to each of the multiple communication devices. In furtherance of controlling use of the bandwidth part configurations, the communication management resource communicates a respective command to each of the multiple communication devices. The respective command indicates a particular selected bandwidth part configuration of the multiple bandwidth part configurations to be used by a corresponding mobile communication device receiving the respective command. Each bandwidth part configuration can be configured to include one or more wireless channels.

The multiple wireless channels can be allocated from a hierarchical tier of wireless channels in which each of the multiple wireless channels is revocable by an entity having higher priority rights than the communication management resource (and corresponding wireless network service provider) receiving the allocation of the first wireless bandwidth for use by the multiple mobile communication devices.

The wireless channels in the allocated first wireless bandwidth may include a set of non-contiguous wireless channels, a set of contiguous wireless channels, or a combination of a set of non-contiguous wireless channels and a set of contiguous wireless channels.

Yet further embodiments herein include, via the communication management resource or other suitable entity, partitioning the allocated first wireless bandwidth into the multiple selectable bandwidth part configurations based on anticipation of revocation of a particular wireless channel of the multiple wireless channels allocated for use.

The communication management resource or other suitable entity can be configured to control use of the bandwidth part configurations to provide multiple communication devices access to a remote network. For example, assume that the communication management resource initially assigns use of a first bandwidth part configuration of the multiple bandwidth part configurations to a first mobile communication device of the multiple mobile communication devices. This can include notifying a first communication device of the mobile communication devices to implement a first bandwidth part configuration selected amongst the multiple bandwidth part configurations. In response to receiving notification of revocation of a first wireless channel of the multiple wireless channels, the communication management resource notifies the first mobile communication device to switchover to use of a second bandwidth part configuration of the multiple bandwidth part configurations. In one embodiment, the second bandwidth part configuration excludes use of the first wireless channel that was implemented in the first bandwidth part configuration, abiding by the requirement to discontinue us each of the deallocated wireless channel.

Note that each of the bandwidth part configurations can be shared by multiple different sets of mobile communication devices. For example, in one embodiment, the communication management resource or other suitable entity schedules simultaneous use of a first bandwidth part configuration of the multiple bandwidth part configurations by multiple wireless stations such as the multiple mobile communication devices.

In further example embodiments, the bandwidth part configuration can be implemented in any suitable manner. For example, in one implementation, the communication management resource or other suitable entity partitions the bandwidth part configurations to include a first bandwidth part configuration and a second bandwidth part configuration. In one embodiment, the second bandwidth part configuration includes a less-than-all portions of wireless channels assigned for use in the first bandwidth part configuration. In further example embodiments, the second bandwidth part configuration of the multiple bandwidth part configurations overlaps with the first bandwidth part configuration of the multiple bandwidth part configurations.

In still further example embodiments, controlling use of the bandwidth part configurations to provide multiple communication devices wireless access to the remote network further includes, via the communication management resource or other suitable entity, communicating a first set of bandwidth part configurations to a first mobile communication device of the multiple mobile communication devices. In response to receiving a change in the allocation of the first wireless bandwidth, the communication management resource produces a second set of bandwidth part configurations.

Still further example embodiments include implementation of one or more maintenance windows in which to communicate updated bandwidth part configurations to each of the one or more wireless stations (such as mobile communication devices). For example, in one embodiment, during a first so-called maintenance window, the communication management resource or other suitable entity communicates the first set of bandwidth part configurations to wireless stations. In response to a condition such as a deallocation or change in allocated bandwidth, during a maintenance period, the communication management resource generates a second set of bandwidth part configurations. The communication management resource communicates the second set of bandwidth part configurations to the one or more wireless stations (such as including the first mobile communication device). In one embodiment, the second set of bandwidth part configurations are a substitute for the first bandwidth part configurations.

Accordingly, embodiments herein provide novel ways of improving use of wireless bandwidth that is subject to deallocation and reallocation.

Note that any of the resources as discussed herein can include one or more computerized devices, wireless stations, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (such as computer hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein. Accordingly, embodiments herein are directed to a method, system, computer program product, etc., that supports operations as discussed herein.

One embodiment includes computer readable storage hardware and/or system having instructions stored thereon to facilitate use of a wireless channel by wireless stations supporting different communication protocols. The instructions, when executed by computer processor hardware, cause the computer processor hardware (such as one or more co-located or disparately located processor devices) to: receive allocation of first wireless bandwidth, the first wireless bandwidth including multiple wireless channels; partition the first wireless bandwidth into multiple selectable bandwidth part configurations, the wireless bandwidth being partitioned based on channel boundaries associated with the multiple wireless channels; and control use of the bandwidth part configurations to provide multiple communication devices access to a remote network.

The ordering of the steps above has been added for clarity sake. Note that any of the processing steps as discussed herein can be performed in any suitable order. Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of wireless technology supporting simultaneous use of multiple wireless protocols (such as New Radio and LTE) by multiple wireless stations. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
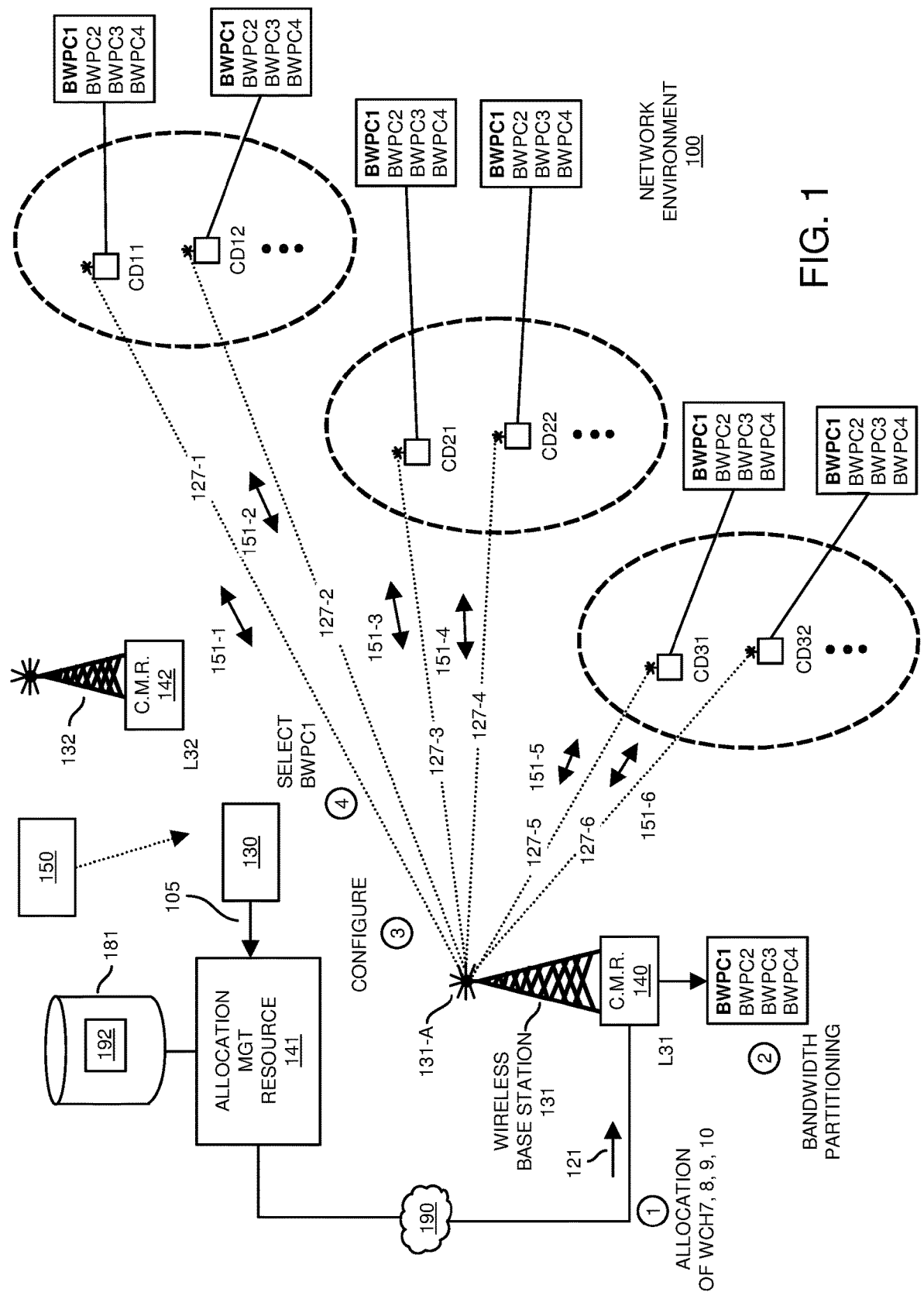
FIG. 1 is an example diagram illustrating a wireless network environment implementing shared use of one or more wireless channels allocated from a tiered wireless channel hierarchy according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

In accordance with general embodiments, a system includes communication management resource (such as hardware, software, or a combination of hardware and software) that controls operation of multiple wireless stations in a network environment. For example, the communication management resource controls operation of multiple wireless stations in a network environment. The communication management resource initially receives allocation of first wireless bandwidth including multiple wireless channels. The communication management resource partitions the first wireless bandwidth into multiple selectable bandwidth part configurations. In one implementation, the first wireless bandwidth is partitioned with respect to channel boundaries associated with the multiple wireless channels. The communication management resource then controls use of the bandwidth part configurations by multiple communication devices to provide wireless access to a remote network. For example, in response to a condition in which a previously allocated wireless channel is no longer available based on use of the wireless channel by a higher priority user, the communication management resource implements a seamless switchover from a first bandwidth part configuration to a second bandwidth part configuration.

Now, more specifically, FIG. 1 is an example diagram illustrating a wireless network environment implementing use of one or more wireless channels allocated from a tiered wireless channel hierarchy according to embodiments herein.

As shown in this example embodiment, network environment 100 includes bandwidth monitor 130, spectrum allocation management resource 141, wireless station 131 at location L31, wireless station 132 at location L32, one or more communication devices (a.k.a. user equipment or UEs) CD11, CD12, . . . , communication devices (user equipment or UEs) CD21, CD22, . . . , communication devices (a.k.a. user equipment or UEs) CD31, CD32, . . . , and network 190 (such as including the Internet, wireless infrastructure, etc.).

Note that each of the resources (such as wireless stations, communication devices, spectrum allocation management resources, spectrum monitor, spectrum manager, etc.) in network environment 100 can be configured to include appropriate hardware, software, or combination of hardware and software to carry out respective operations as discussed herein.

For example, spectrum allocation management resource 141 (i.e., a communication management resource) can be configured as spectrum allocation management hardware, spectrum allocation management software, or a combination of spectrum allocation management hardware and spectrum allocation management software; bandwidth monitor 130 can be configured as bandwidth monitor hardware, bandwidth monitor software, or a combination of bandwidth monitor hardware and bandwidth monitor software; each communication management resource (such as associated with a respective wireless base station or other entity) can be configured as communication management hardware, communication management software, or a combination of communication management hardware and communication management software; communication management resource 140 can be configured as communication management hardware, communication management software, or a combination of communication management hardware and communication management software; and so on.

Each communication device is mobile or stationary with respect to a corresponding wireless station providing it access to network 190.

As further shown, wireless station 131 (such as operated by a first wireless network service provider) is disposed at location L31 providing communication devices CD11, CD12, . . . , CD21, CD22, . . . , CD31, CD32, . . . , etc., access to one or more remote server resources through network 190.

Wireless network environment 100 can be configured to include wireless base stations operated by any number of different wireless network service providers.

In this example embodiment, assume that the wireless base station 131 is a PAL (licensed) wireless channel user and/or a GAA wireless channel user. Thus, wireless base station 131 and corresponding communication management resource 140 can be configured to use PAL and/or GAA wireless channels.

As its name suggests, bandwidth monitor 130 monitors use of wireless bandwidth by higher priority entities (such as higher priority entity 150) in the wireless network environment 100. For example, the bandwidth monitor 130 can be configured to monitor use of the wireless bandwidth by the wireless system 150 via detecting wireless signals of a particular type that are known to be transmitted from the wireless system 150 into the network environment 100. Additionally, or alternatively, the bandwidth monitor 130 can be configured to receive information regarding usage of bandwidth via communications from a wireless station. For example, the bandwidth monitor 130 can be configured to receive one or more notifications indicating scheduled or actual use of the wireless bandwidth by the RADAR system 150.

As previously discussed, the wireless base station 131 and corresponding wireless network service provider initially registers with the spectrum allocation management resource 141 (communication management resource). Assume in this example embodiment that, in processing operation #1, spectrum allocation management resource 141 (such as a so-called spectrum access system) assigns the wireless base station 131 and corresponding one or more communication devices CD11, CD12, etc., use of wireless channels 7, 8, 9, and 10 (such as one or more PAL and/or GAA wireless channels).

Note that additional embodiments as discussed herein can include allocating the communication management resource 140 wireless bandwidth from multiple different wireless bands such as including a so-called C-band. In general, C-band is lower on the radio spectrum compared to millimeter-wave spectrum (24-47 GHz) such as around 4 GHz to 8 GHz frequency range.

Note that the communication management resource 140 can be simultaneously allocated bandwidth from different bands (such as C-band, CBRS band, etc.).

As previously discussed, an incumbent user (such as higher priority entity 150) has higher channel usage and interference protection priority rights than both the PAL wireless channel users and GAA wireless channel users. PAL users have higher priority rights than GAA users. Thus, the bandwidth allocated to the wireless base station and corresponding communication management resource 140 is based on tiered priority rights.

When no incumbent use (such as via wireless station 150) of the wireless channels 7, 8, 9 and 10 is detected by the bandwidth monitor 130 or other entity, the allocation management resource 140 and corresponding wireless stations in the wireless network environment 100 operate in mode #1 (standard mode of channel assignment and usage) in which the wireless stations (wireless base stations, communication devices, etc.) use the allocated wireless channels 7, 8, 9, and 10 without regard to any higher priority entity user.

Thus, in processing operation #1, the communication management resource 140 receives allocation of wireless channels 7, 8, 9, and 10 from the allocation management resource 141. In processing operation #2, the communication management resource 140 partitions the received bandwidth into different so-called bandwidth part configurations, an example of which is shown in FIG. 2.

Figure 2:
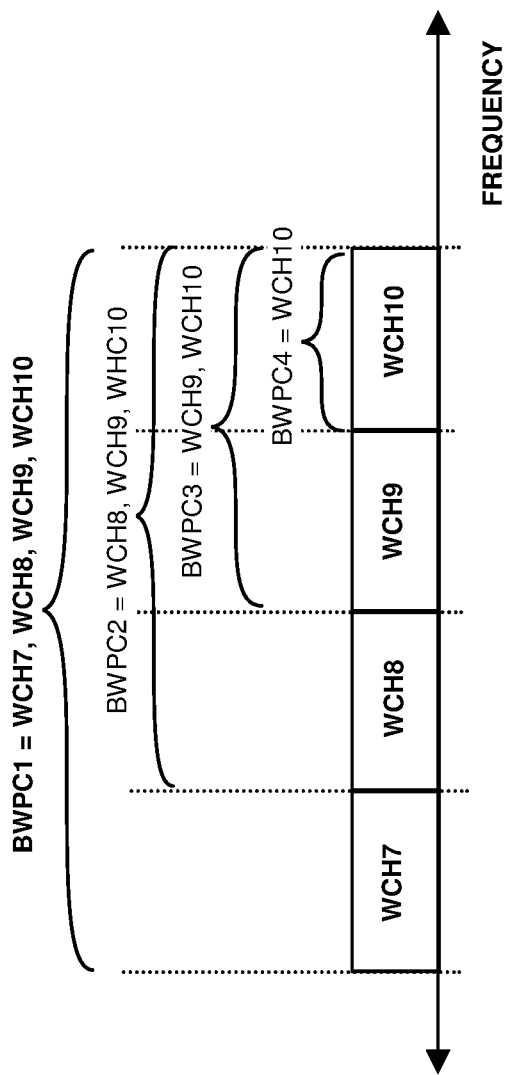
FIG. 2 is an example diagram illustrating partitioning of wireless bandwidth into multiple different bandwidth part configurations along wireless channel boundaries according to embodiments herein.

FIG. 2 is an example diagram illustrating partitioning (in frequency and time) of wireless bandwidth into multiple different bandwidth part configurations according to embodiments herein.

In one embodiment, the communication management resource 140 partitions the allocated wireless bandwidth (such as wireless channels 7, 8, 9 and 10) into multiple selectable bandwidth part configurations BWPC1, BWPC2, BWPC3, and BWPC4. In one embodiment, as shown, the communication management resource 140 partitions the allocated wireless bandwidth with respect to channel boundaries associated with the multiple wireless channels 7, 8, 9, and 10.

More specifically, in this example embodiment, the communication management resource 140 sets the bandwidth part configuration BWPC1 to include all of the allocated wireless channels 7, 8, 9, and 10 (also known as wireless channel WCH7, wireless channel WCH8, wireless channel WCH9, and wireless channel WCH10).

The communication management resource 140 sets the bandwidth part configuration BWPC2 to include a less than all portion of the allocated wireless channels including wireless channels 8, 9, and 10.

The communication management resource 140 sets the bandwidth part configuration BWPC3 to include a less than all portion of the allocated wireless channels including wireless channels 9 and 10.

The communication management resource 140 sets the bandwidth part configuration BWPC3 to include a less than all portion of the allocated wireless channels including wireless channel 10.

Thus, if any of wireless channels is deallocated from use, any of the backup bandwidth part configuration options (with fewer wireless channels such as bandwidth part configuration BWPC2, bandwidth part configuration BWPC3, bandwidth part configuration BWPC4) are available for selection as wireless channels become unavailable.

In one embodiment, the communication management resource 140 partitions and generates the bandwidth part configurations in anticipation that one or more of the allocated wireless channels 7, 8, 9, and 10 may be revoked based on use of any of these wireless channels by an entity having higher priority rights than the wireless network service provider implementing the communication management resource 140 and corresponding network (such as including wireless communication links 127). Wireless channel WCH7 may be the wireless channel that is determined to be most likely to be deallocated based on use by the higher priority entity 150. In such an instance, the communication management resource 140 produces the backup bandwidth part configuration BWPC2 to exclude wireless channel WCH7. Wireless channel WCH8 may be the wireless channel that is determined to be next most likely to be deallocated based on use by the higher priority entity 150. In such an instance, the communication management resource 140 produces the backup bandwidth part configuration BWPC3 to exclude wireless channel WCH7 and wireless channel WCH8. In this manner, the communication management resource 140 or other suitable entity can be configured to produce bandwidth part configurations based on a degree to which the one or more allocated wireless channels may not be available for use.

Referring again to FIG. 1, in further processing operations, the communication management resource 140 controls use of the bandwidth part configurations by multiple communication devices to provide wireless access to a remote network.

For example, in processing operation #3, the communication management resource 140 or other suitable entity communicates configuration settings associated with the different available bandwidth part configurations BWPC1, BWPC2, BWPC3, and BWPC4 over respective wireless communication links 127-1, 127-2, 127-3, 127-4, 127-5, and 127-6 (collectively, wireless communication links 127) to the communication devices.

More specifically, via communications 151-1 over the wireless communication link 127-1, the communication management resource 140 or other suitable entity notifies communication device CD11 of the available bandwidth part configuration options BWPC1, BWPC2, BWPC3, and BWPC4. This can include communicating notification (via communications 151-1 over wireless communication link 127-1) to communication device CD11 that: i) bandwidth part configuration BWPC1 supports use of wireless channels 7, 8, 9, and 10, ii) bandwidth part configuration BWPC2 supports use of wireless channels 8, 9, and 10, iii) bandwidth part configuration BWPC3 supports use of wireless channels 9 and 10; and so on.

The communication management resource 140 notifies each of the communication devices in a similar manner.

For example, via communications 151-2 over the wireless communication link 127-2, the communication management resource 140 or other suitable entity notifies (via communications 151-2 over wireless communication link 127-2) communication device CD12 of the available bandwidth part configuration options BWPC1, BWPC2, BWPC3, and BWPC4. This can include communicating notification to communication device CD12 that: i) bandwidth part configuration BWPC1 supports use of wireless channels 7, 8, 9, and 10, ii) bandwidth part configuration BWPC2 supports use of wireless channels 8, 9, and 10, iii) bandwidth part configuration BWPC3 supports use of wireless channels 9 and 10; and so on.

Via communications 151-3 over the wireless communication link 127-3, the communication management resource 140 or other suitable entity notifies (via communications 151-3 over wireless communication link 127-1) communication device CD21 of the available bandwidth part configuration options BWPC1, BWPC2, BWPC3, and BWPC4. This can include communicating notification to communication device CD21 that: i) bandwidth part configuration BWPC1 supports use of wireless channels 7, 8, 9, and 10, ii) bandwidth part configuration BWPC2 supports use of wireless channels 8, 9, and 10, iii) bandwidth part configuration BWPC3 supports use of wireless channels 9 and 10; and so on.

Via communications 151-4 over the wireless communication link 127-4, the communication management resource 140 or other suitable entity notifies (via communications 151-3 over wireless communication link 127-3) communication device CD12 of the available bandwidth part configuration options BWPC1, BWPC2, BWPC3, and BWPC4. This can include communicating notification to communication device CD22 that: i) bandwidth part configuration BWPC1 supports use of wireless channels 7, 8, 9, and 10, ii) bandwidth part configuration BWPC2 supports use of wireless channels 8, 9, and 10, iii) bandwidth part configuration BWPC3 supports use of wireless channels 9 and 10; and so on.

In such an instance, the wireless base station 131 and corresponding communication devices CD11, CD12, . . . , CD21, CD22, . . . , CD31, CD32, . . . , etc., are made aware of the different possible selectable bandwidth part configuration options. In other words, prior to even using the different selectable bandwidth part configurations, each of the multiple communication devices in the network environment 100 are made aware of the different possible bandwidth part configuration options selectable by the wireless base station 131.

Subsequent to communicating the possible bandwidth part configuration options to each of the communication devices, in processing operation #4, the communication management resource 140 or other suitable entity communicates selection of a particular bandwidth part configuration option to the target communication device. The communication management resource 140 can be configured to notify a target communication device to use any of the selectable bandwidth part configuration options—each of the communication devices can be assigned use of a different bandwidth part configuration option.

In one embodiment, the communication management resource 140 implements RRC signaling based on Radio Resource Control (RRC) protocol to select and/or switch between use of the different bandwidth part configuration options for each of the communication devices.

In this example embodiment, subsequent to processing operation #3, in processing operation #4, the communication management resource 140 notifies: i) the communication device CD11 (via communications 151-1 over wireless communication link 127-1) to implement use of the bandwidth part configuration option BWPC1, ii) the communication device CD12 (via communications 151-2 over wireless communication link 127-2) to implement use of the bandwidth part configuration option BWPC1, iii) the communication device CD21 (via communications 151-3 over wireless communication link 127-3) to implement use of the bandwidth part configuration option BWPC1, iv) the communication device CD22 (via communications 151-4 over wireless communication link 127-4) to implement use of the bandwidth part configuration option BWPC1, v) the communication device CD31 to implement use of the bandwidth part configuration option BWPC1, ii) the communication device CD32 to implement use of the bandwidth part configuration option BWPC1, and so on.

In one non-limiting example embodiment, the communication system and corresponding communication management resource 140 operate under one or more of the following conditions:

Allocated Channel BW from the allocation management resource 141 or other suitable entity can be as high as 400 MHz, or possibly more Provide flexibility & Power saving in DL & UL operations Each UE can be assigned up to 4 (of the potentially more) bandwidth part configurations A respective UE cannot be on 2 different BWPs at the same time A UE can be moved by the gNB (wireless base station 131 of communication management resource 140) from one bandwidth part configuration to another bandwidth part configuration (such as via RRC signaling based on Radio Resource Control (RRC) protocol)

Changing BWP=Bandwidth Adaption

5G Supports a flexible frame structure

OFDM numerology dictates SCS and CP

Figure 3:
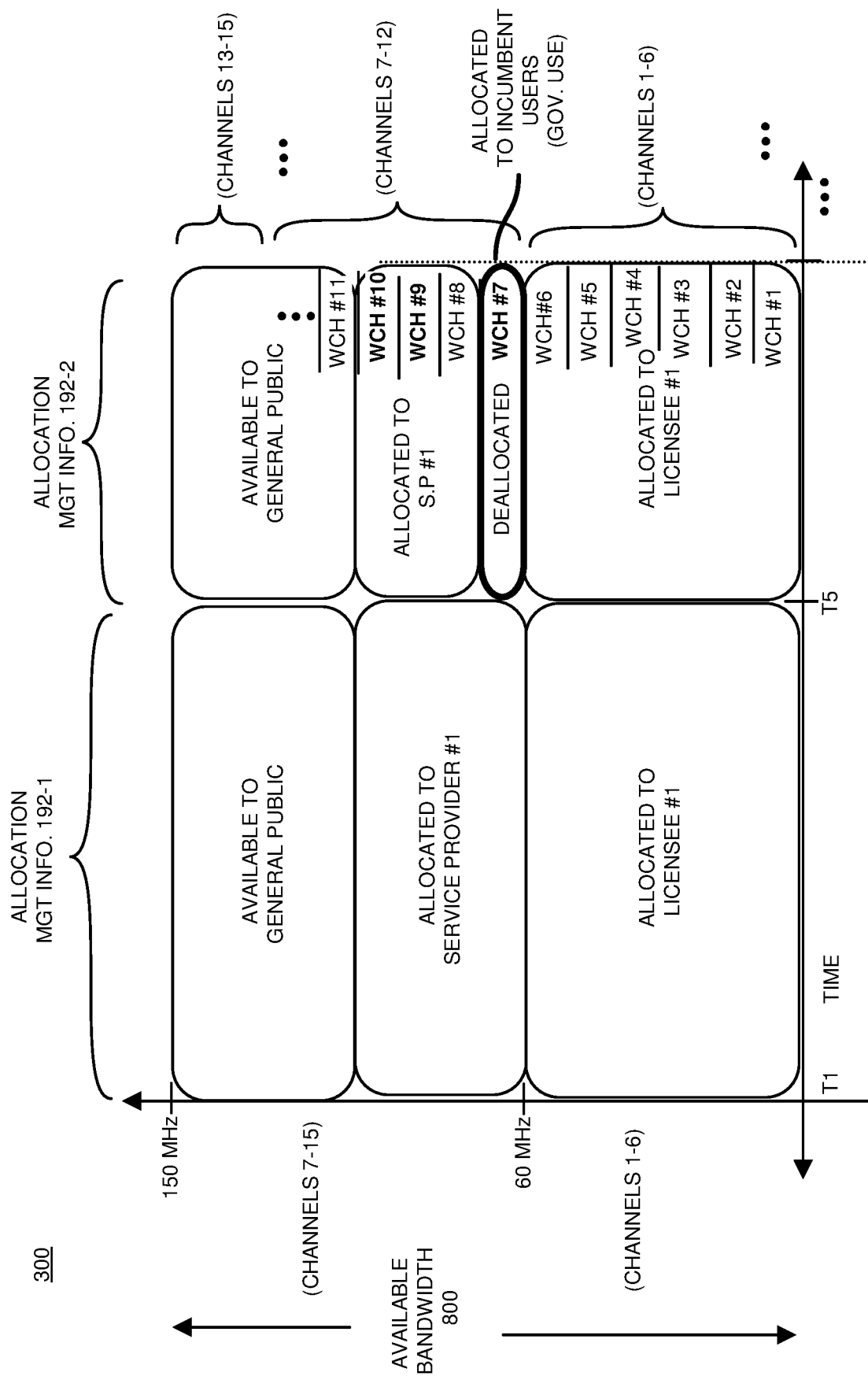
FIG. 3 is an example diagram illustrating allocation of wireless bandwidth over time in accordance with a tiered priority hierarchy of users according to embodiments herein.

Carrier bandwidth parts simplify device processing, save battery power and support different numerologies FIG. 3 is an example diagram illustrating allocation of wireless bandwidth over time in accordance with a tiered priority hierarchy of users according to embodiments herein.

As previously discussed, spectrum allocation management resource 141 can be configured to allocate any suitable type of wireless spectrum (spectrum, wireless channels, etc.) for use by the communication devices such as wireless base stations in the network environment 100.

In one non-limiting example embodiment, the spectrum allocation management resource 140 allocates spectrum (such as one or more wireless channels) in accordance with a tiered priority hierarchy such as bandwidth from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the spectrum allocation management resource 141 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. For example, between time T1 and time T5, embodiments herein include operating communication management resource 140 in mode #1. If government use (such as use via a so-called incumbent user operating RADAR system 150) is detected or requested via appropriate input 105 to the monitor resource 130, certain channels (such as those used by the general public and possibly wireless channels associated with licensed wireless network service providers) are no longer fully available for use as shown between time T5 and time T9. In such an instance, between time T5 and T9, the communication management resource 140 and corresponding network of resources operate in mode #2 in which the wireless network service provider no longer uses the wireless channel #7 (a.k.a., WCH7).

More specifically, in this example, graph 300 indicates that between time T1 and time T5 (such as mode #1 or first condition), there is no indication or detection of an incumbent user and thus wireless channels 1-16 are available for use by the wireless network service providers (such as licensed users and GAA users). In a manner as previously discussed, the wireless channels 7, 8, 9, and 10 (a.k.a., WCH7, WCH8, WCH9, and WCH10) are initially allocated for use by the wireless base station 131 and corresponding communication devices CD11, CD12, . . . , CD21, CD22, . . . , CD31, CD32, . . . , in network environment 100.

As further shown, at or around time T5, assume that a bandwidth monitor or other suitable entity detects use of the wireless channel 7 by an incumbent user (such as via operating the RADAR system 150) having higher priority use rights than any PAL users and GAA users. In such an instance, the bandwidth monitor or other suitable entity notifies the spectrum allocation management resource 141 of such use via input 105. The receipt of the notification (input 105) indicating use of the wireless channel #7 by the higher priority entity (government user) prompts the allocation management resource 141 to deallocate use of wireless channel #7 by the communication management resource 140. Although the wireless channel #7 is used by the higher priority entity, other wireless channels such as wireless channels 1-6 and 8-16 may still be open for use because they are not used by the higher priority entity.

Figure 4:
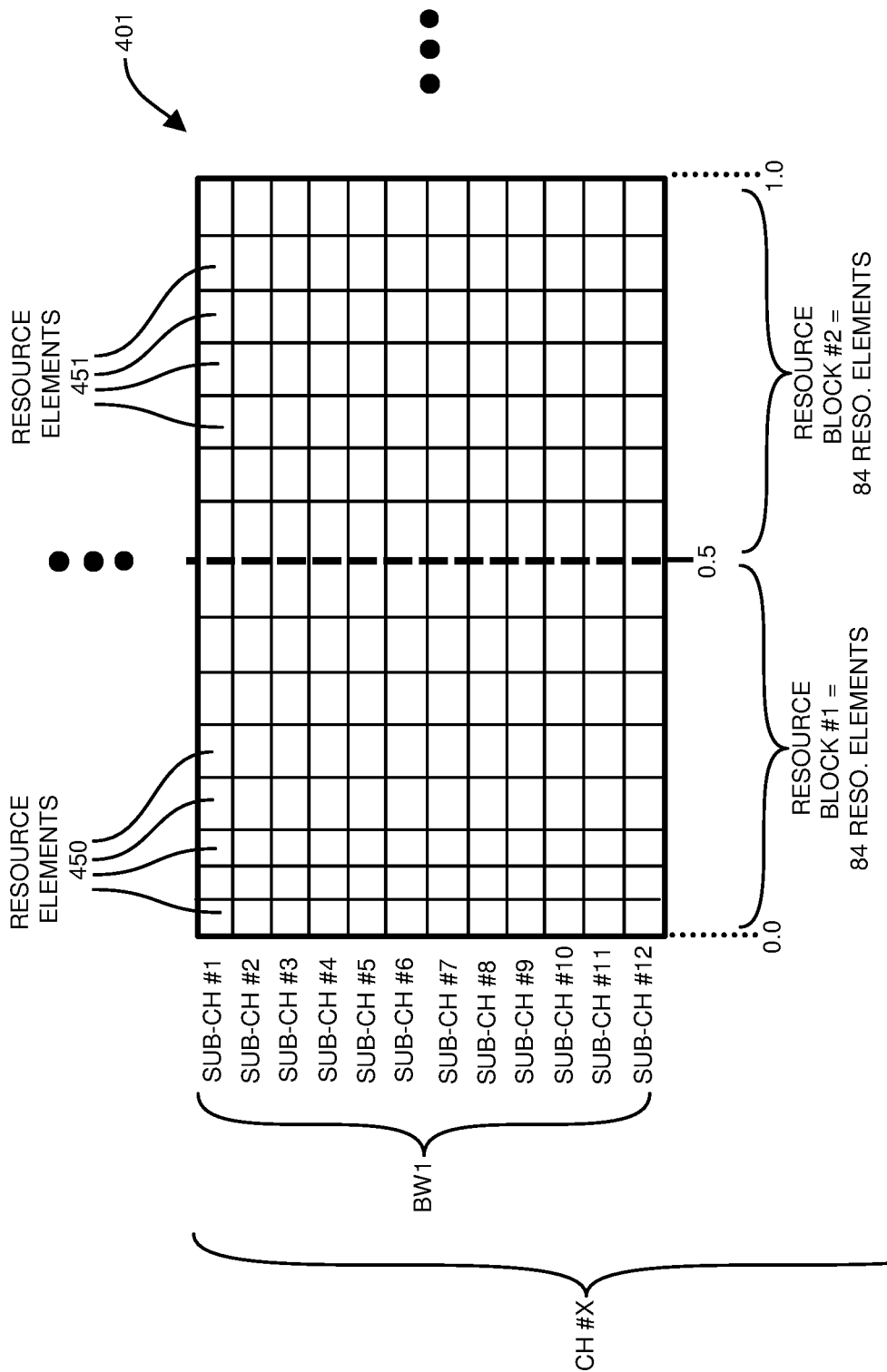
FIG. 4 is an example diagram illustrating partitioning of allocated bandwidth (such as one or more wireless channels or bandwidth parts) into sub-carrier frequencies and resource blocks over time for shared used by multiple wireless stations according to embodiments herein.

FIG. 4 is an example diagram illustrating partitioning of allocated bandwidth (such as one or more wireless channels or bandwidth parts) into sub-carrier frequencies and resource blocks for shared used by multiple wireless stations according to embodiments herein.

As previously discussed, each of the bandwidth part configurations includes one or more wireless channels in which to support wireless communications in a network environment 100. In this example embodiment, each of the bandwidth part configuration options and corresponding one or more wireless channels are sub-divided into sub-channels for shared use in the time domain. In other words, the wireless channels are partitioned in frequency (such as into multiple sub-channels) and time (such as according to timeslots) to accommodate shared use by multiple wireless stations.

For example, all or a portion of each wireless channel X (such as wireless channels 7, 8, 9, and 10) can be subscriber-divided to include sub-channels SUB-CHANNEL #1, SUB-CHANNEL #2, SUB-CHANNEL #3, . . . , SUB-CHANNEL #12. For a given timeslot such as between 0.0 and 1.0, each subscriber-channel includes multiple resource elements 450, 451. The collection of resource elements 450 and 451 in a given timeslot represents a respective resource block 401.

In further example embodiments, physical resource block 401 includes multiple resource elements 450, 451, each of which supports conveyance of a respective symbol. In the time domain, as previously discussed, the physical resource block 401 falls within a time slot between time 0 and 1; the time slot #1 includes 14 sub-time slots, one for each symbol. Additionally, in the time domain, the physical resource block 401 resides in bandwidth CH #X, including multiple sub-carrier frequencies in the base-band such as SUB-CHANNEL #1, SUB-CHANNEL #2, SUB-CHANNEL #3, . . . , SUB-CHANNEL #12. In one nonlimiting example embodiment, each sub-carrier frequency or sub-channel is spaced by 15 KHz; bandwidth BW1 of allocated wireless channel CH #X therefore represents 180 KHz.

Each of the resource elements supports uplink or downlink communications, enabling the wireless base station 131 and communication devices to communicate with each other. In one embodiment, pilot or reference symbols may be scheduled for transmission from the wireless base station 131 to remote communication devices in one or more of the resource elements 450 of the physical resource block 401.

As further discussed below, each physical resource block can be assigned to support uplink or downlink communications. Thus, each less-than-all portion of the wireless channels in each bandwidth part configuration can be shared by the wireless communication devices to support communications with the wireless base station 131. For example, a first portion of the bandwidth part configuration (such as one or more resource elements) of a timeslot (and respective resource block) can be scheduled for use by the wireless base station 131 to communicate data to the communication device CD11; a second portion of the bandwidth part configuration of the timeslot can be scheduled for use by the wireless base station 131 to communicate data to communication device CD12; . . . ; a third portion of the bandwidth part configuration of the timeslot can be scheduled for use by the wireless base station 131 to communicate data to communication device CD21; a fourth portion of the bandwidth part configuration of the timeslot can be scheduled for use by the wireless base station 131 to communicate data to communication device CD22; and so on.

A portion of the bandwidth part configuration (such as one or more resource elements) of any timeslot (resource block) can be scheduled for use by the wireless base station 131 to receive data from the communication device CD11; a portion of the bandwidth part configuration in nay timeslot can be scheduled for use by the wireless base station 131 to receive data from communication device CD12; . . . ; a portion of the bandwidth part configuration of the any timeslot can be scheduled for use by the wireless base station 131 to receive data from communication device CD21; a portion of the bandwidth part configuration of any timeslot can be scheduled for use by the wireless base station 131 to receive data from communication device CD22; and so on.

Thus, each channel of the corresponding bandwidth part configuration can be split in frequency and time to support simultaneous use of the wireless channels by the multiple wireless stations (wireless base station and communication devices).

Figure 5:
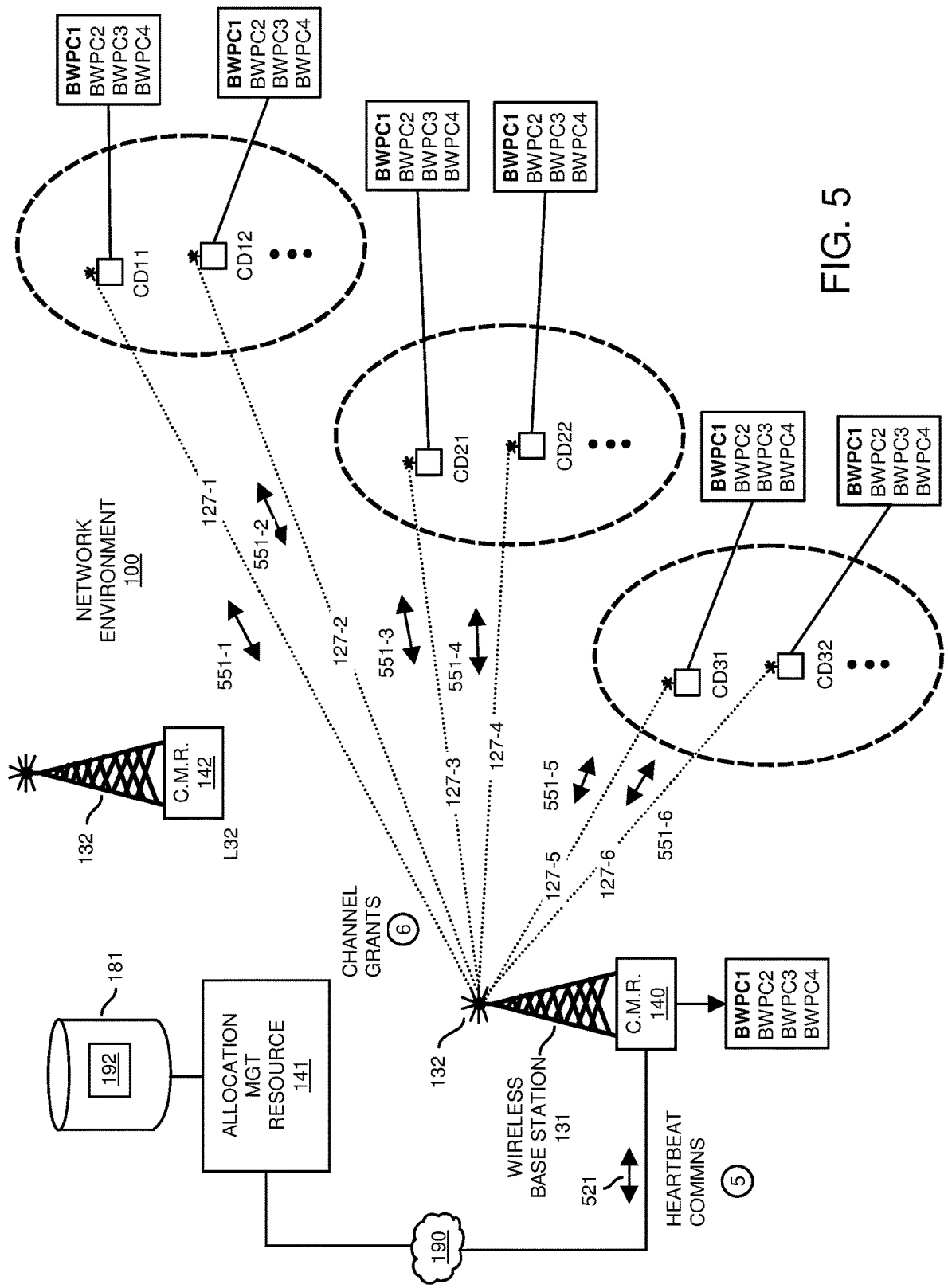
FIG. 5 is an example diagram illustrating notification of scheduled grants to different wireless stations and corresponding using different bandwidth parts to support wireless communications according to embodiments herein.

FIG. 5 is an example diagram illustrating notification of scheduled grants to different wireless stations and corresponding using different bandwidth parts to support wireless communications according to embodiments herein.

Via heartbeat communications 521 between the communication management resource 140 and the allocation management resource 141, in processing operation #5, the wireless base station 131 and corresponding communication management resource 140 receive continued allocation of wireless channels 7, 8, 9, and 10. This means that the communication management resource 140 and corresponding communication devices are able to continue to use bandwidth part configuration BWPC1 to support wireless spectrum communications.

In processing operation #6, via scheduled use of resource elements, the communication management resource 140 uses resource elements of resource blocks to communicate in the downlink to each of the communication devices. The communication management resource 140 notifies the communication devices of allocated resource blocks or portions thereof in which the communication devices are scheduled to communicate in uplink to the wireless base station 131. Thus, bandwidth part configuration BWPC1 supports uplink and downlink communications between the wireless base station 131 and corresponding communication devices. The allocated resource wireless channels and corresponding bandwidth part configuration BWPC1 are reallocated by the wireless base station 131 in time and frequency (such as wireless channels 7, 8, 9, and 10) for use in different timeslots to support the wireless uplink and downlink communications.

Figure 6:
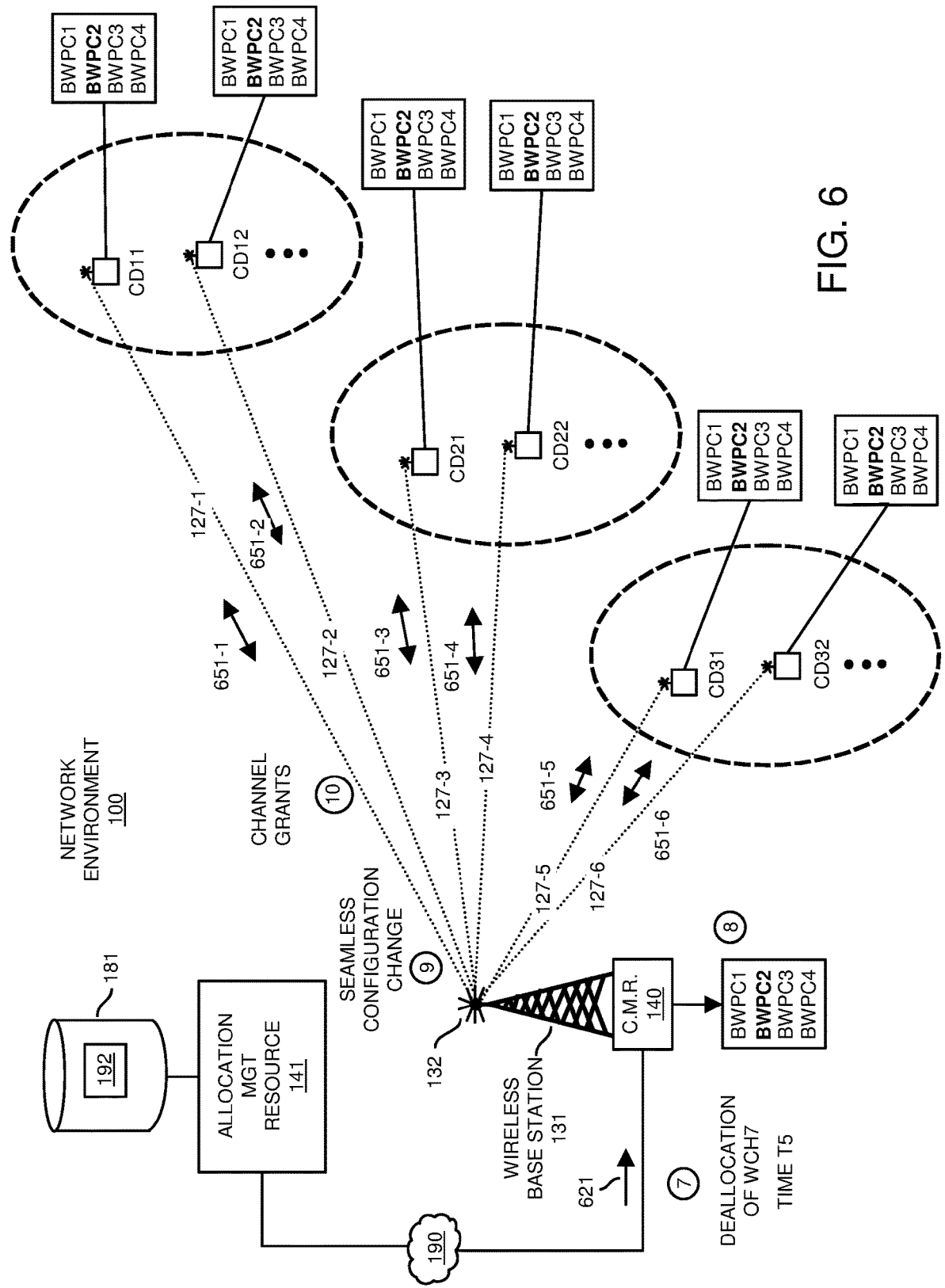
FIG. 6 is an example diagram illustrating deallocation of a respective wireless channel and seamless switchover to implementing an alternative bandwidth part configuration according to embodiments herein.

FIG. 6 is an example diagram illustrating deallocation of a respective wireless channel and seamless switchover to implementing an alternative bandwidth part configuration according to embodiments herein.

Via communications 621, in processing operation #7, the wireless base station 131 and corresponding communication management resource 140 receive notification from allocation management resource 141 that a portion of the previously allocated wireless channels have been revoked. For example, communications 621 indicate that wireless channel 7 is no longer available for use. This means that the communication management resource 140 and corresponding communication devices are unable to continue to use all of bandwidth part configuration BWPC1 to support wireless spectrum communications.

In processing operation #8, in response to receiving the deallocation notification, the communication management resource 140 updates the selection of the bandwidth part configuration to be implemented by the wireless base station 131 and the corresponding communication devices. For example, because bandwidth part configuration BWPC1 is no longer available for use because it relies on use of revoked wireless channel #7, the communication management resource 140 selects the bandwidth part configuration BWPC2 to support wireless communications in the network environment 100. In accordance with the selection of bandwidth part configuration BWPC2 and corresponding seamless wireless channel change, the communication management resource 140 communicates a notification to each of the communication devices CD11, CD12, . . . , CD21, CD22, . . . , CD31, CD32, . . . , to discontinue use of bandwidth part configuration BWPC1 and use bandwidth part configuration BWPC2 as a substitute in processing operation #9.

In response to receiving the notification, the communication devices know to use substitute bandwidth part configuration BWPC2 such as including wireless channels 8, 9, and 10. In one embodiment, there is no need for the communication management resource 140 to communicate update setting information for bandwidth part configuration BWCP2 because the settings information was previously communicated in processing operation #3. Thus, in contrast to conventional techniques, embodiments herein do not require rebooting of the wireless system, resulting in no loss or minimal loss of wireless connectivity of corresponding mobile communication devices through the wireless base station 131 to the remote network 190. More specifically, conventional techniques require the wireless stations (wireless base station 131 and communication devices) to terminate wireless connectivity, obtain re-allocation of new wireless channels, and notification of the new wireless channels to the communication devices to establish connectivity again. The seamless switchover to a new bandwidth part configuration allows continuous wireless connectivity of the communication devices with the wireless base station 131 even though a wireless channel 7 is deallocated from use.

In processing operation #10, the communication management resource 140 uses resource elements of resource blocks of the bandwidth part configuration BWPC2 to communicate in the downlink to each of the communication devices. The communication management resource 140 notifies the communication devices of allocated resource blocks or portions from only bandwidth part configuration BWPC2 in which the communication devices are scheduled to communicate in uplink to the wireless base station 131 in processing operation #10.

Figure 7:
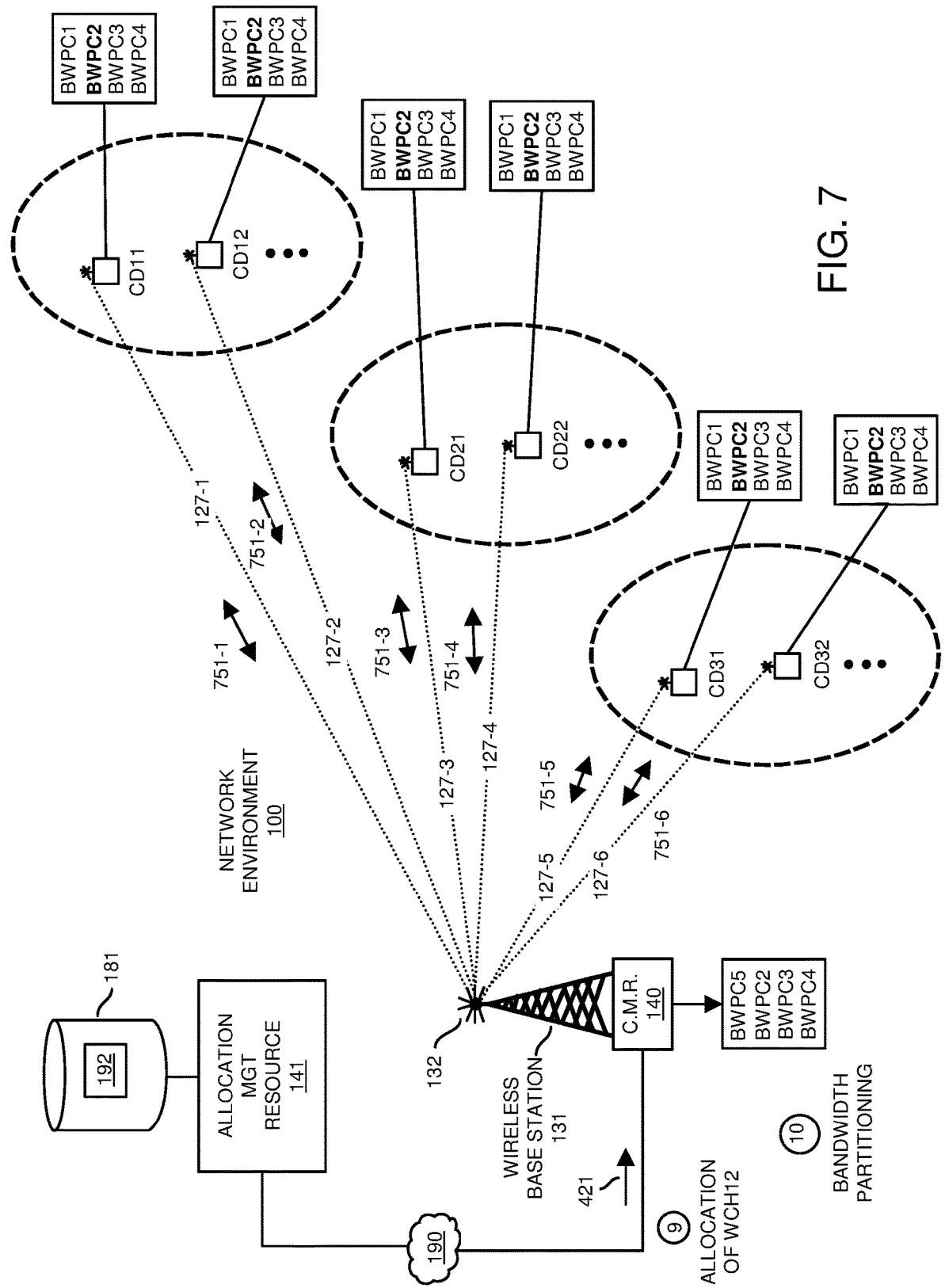
FIG. 7 is an example diagram illustrating allocation of a new wireless channel and regeneration of new bandwidth part configuration options based on the allocated wireless channels according to embodiments herein.

FIG. 7 is an example diagram illustrating allocation of a new wireless channel and regeneration of new bandwidth part configuration options based on the allocated wireless channels according to embodiments herein.

In further example embodiments, the communication management resource 140 can be configured to update the selectable bandwidth part configurations in response to receiving allocation of one or more new wireless channels. For example, the communication management resource 140 may not expect to receive allocation of the wireless channel #7 again any time soon. In such an instance, the communication management resource 140 may request allocation of another wireless channel from the allocation management resource 141. In response to such a request, assume that the allocation management resource 141 newly allocates wireless channel #12 to the communication management resource in addition to the previously allocated wireless channels 8, 9, and 10. An example of repartitioning in processing operation #10 is shown in FIG. 8.

Figure 8:
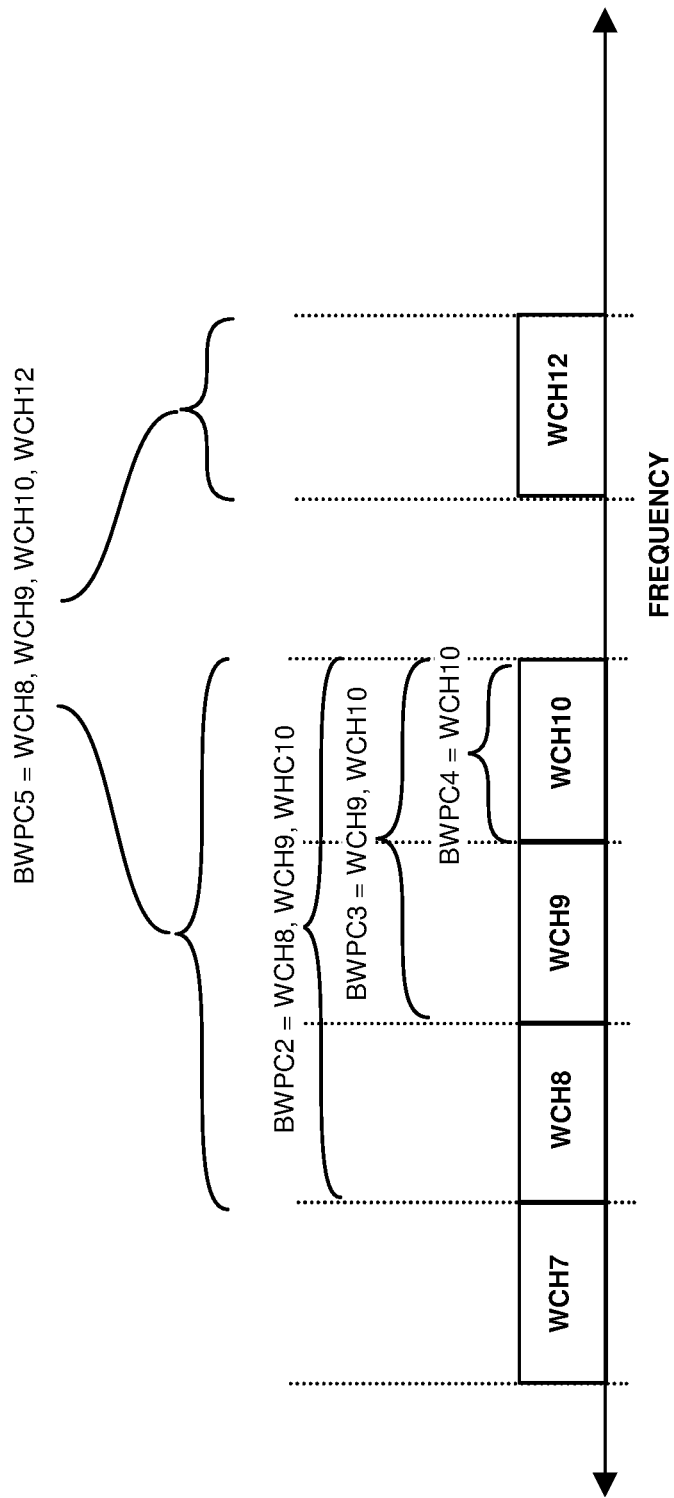
FIG. 8 is an example diagram illustrating partitioning of wireless bandwidth into multiple different bandwidth part configurations including a newly allocated wireless channel according to embodiments herein.

FIG. 8 is an example diagram illustrating partitioning of wireless bandwidth into multiple different bandwidth part configurations including a newly allocated wireless channel according to embodiments herein.

In this example embodiment, the communication management resource 140 partitions the allocated noncontiguous wireless bandwidth (such as wireless channels 8, 9, 10, and 12) into multiple selectable bandwidth part configurations BWPC2, BWPC3, BWPC4, and BWCP5.

In one embodiment, as shown, the communication management resource 140 partitions the allocated wireless bandwidth with respect to channel boundaries associated with the multiple wireless channels 8, 9, 10, and 12.

More specifically, in this example embodiment, the communication management resource 140 sets the bandwidth part configuration BWPC5 to include all of the allocated wireless channels 8, 9, 10, and 12 (also known as wireless channel WCH8, wireless channel WCH9, wireless channel WCH10, and wireless channel the WCH12). The communication management resource 140 sets the bandwidth part configuration BWPC2 to include a less than all portion of the allocated wireless channels including wireless channels 8, 9, and 10. The communication management resource 140 sets the bandwidth part configuration BWPC3 to include a less than all portion of the allocated wireless channels including wireless channels 9 and 10.

In a similar manner as previously discussed, the communication management resource 140 partitions and generates the bandwidth part configurations in anticipation that one or more of the allocated wireless channels 8, 9, 10, and 12 may be revoked based on use of any of these wireless channels by an entity having higher priority rights than the wireless network service provider implementing the communication management resource 140 and corresponding network (such as including wireless communication links 127).

Figure 9:
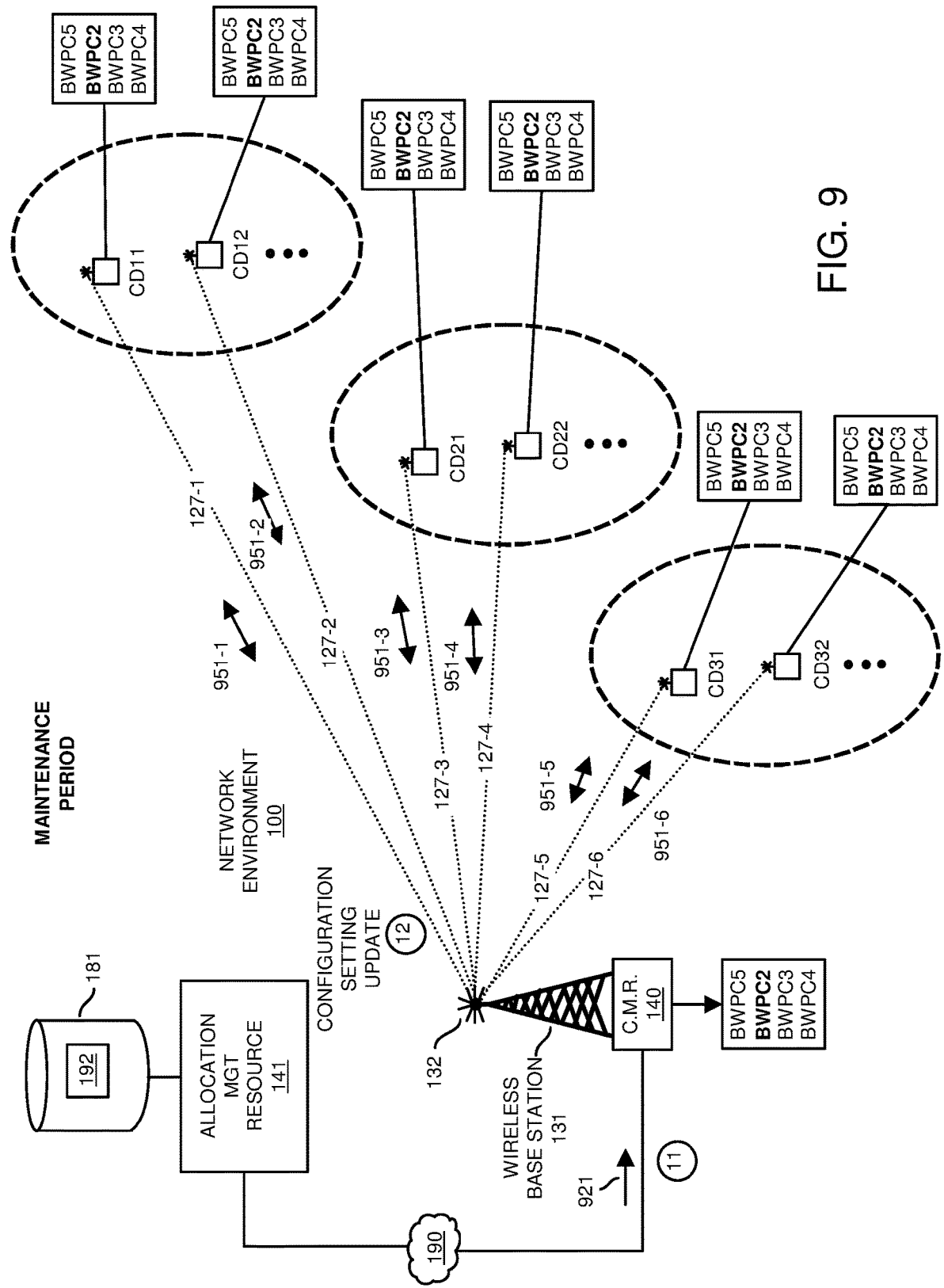
FIG. 9 is an example diagram illustrating distribution of the new bandwidth part configuration option and corresponding settings to wireless stations in a network environment according to embodiments herein.

FIG. 9 is an example diagram illustrating distribution of the new bandwidth part configuration option to wireless stations in a network environment according to embodiments herein.

In processing operation #11, via heartbeat communications 921 between the communication management resource 140 and the allocation management resource 141, the wireless base station 131 and corresponding communication management resource 140 receive continued allocation of wireless channels 8, 9, 10, and 12. This means that the communication management resource 140 and corresponding communication devices are able to continue to use bandwidth part configuration BWPC2 to support wireless communications.

An appropriate time such as during a maintenance period, in processing operation #12, the communication management resource communicates the updates bandwidth part configuration information (BWPC5) and corresponding frequency and usage information to each of the communication devices CD11, CD12, . . . , CD21, CD22, . . . , CD31, CD32, . . . , etc. The bandwidth part configuration BWPC5 can be a replacement to bandwidth part configuration BWPC1 such that the wireless base station 131 and corresponding communication management resource 140 need not communicate configuration setting information associated with bandwidth part configurations BWCP2, BWCP3, and BWCP4 again to the communication devices. In one embodiment, the communication devices are able to continue use of the bandwidth part configuration BWPC2 to support wireless communications.

Figure 10:
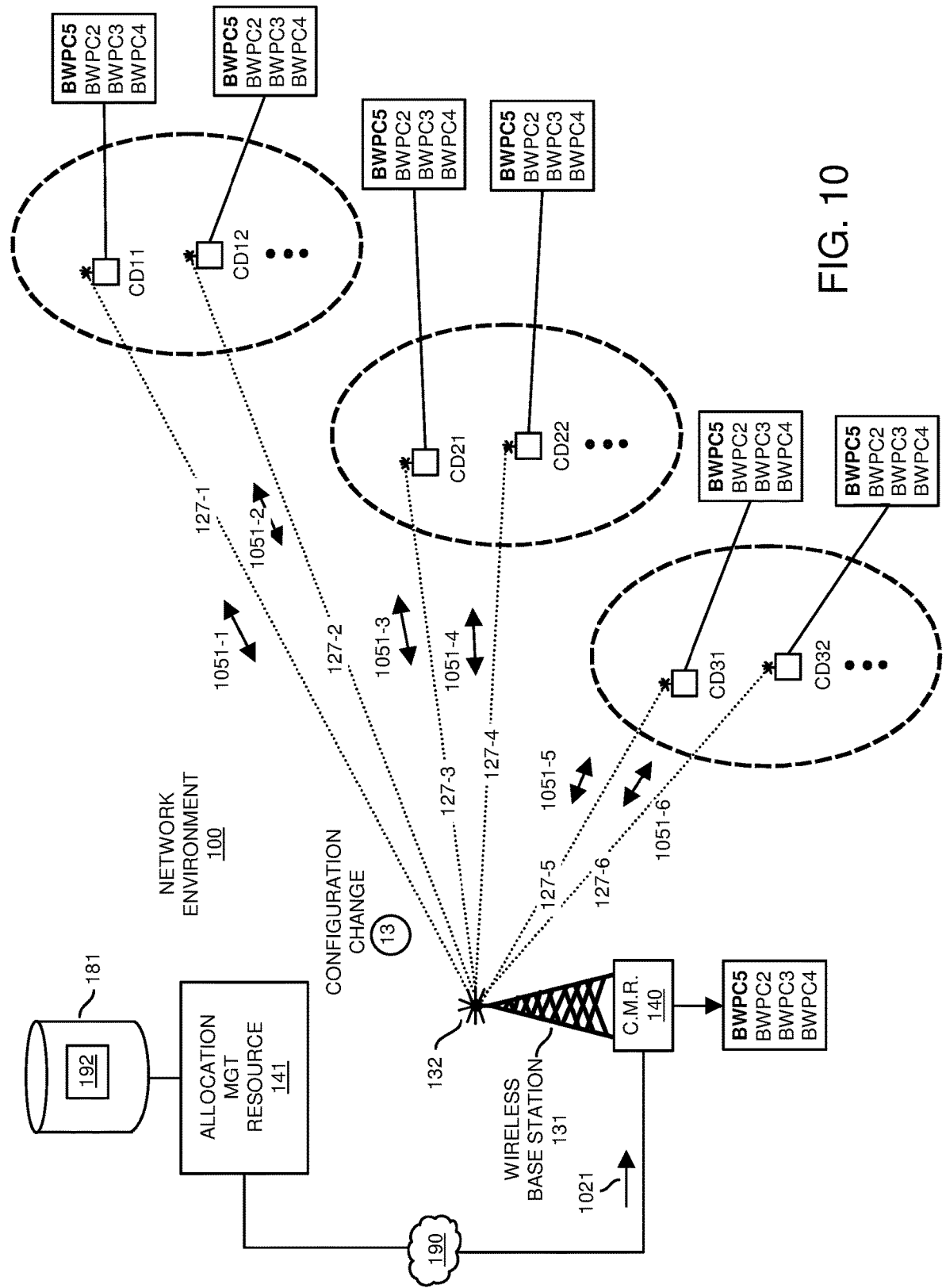
FIG. 10 is an example diagram illustrating seamless switchover to implementing an alternative bandwidth part configuration according to embodiments herein.

FIG. 10 is an example diagram illustrating seamless switchover to implementing an alternative bandwidth part configuration according to embodiments herein.

In processing operation #13, the communication management resource 140 updates the selection of the bandwidth part configuration to be implemented by the wireless base station 131 and the corresponding communication devices. For example, because bandwidth part configuration BWPC5 is available for use and provides greater bandwidth, the communication management resource 140 selects the bandwidth part configuration BWPC5 to support wireless communications in the network environment 100 as a substitute to bandwidth part configuration BWPC2. In accordance with the selection of bandwidth part configuration BWPC5, the communication management resource 140 communicates a notification to each of the communication devices CD11, CD12, . . . , CD21, CD22, . . . , CD31, CD32, . . . , to use bandwidth part configuration BWPC5 instead of bandwidth part configuration BWPC2.

In response to receiving the notification, the communication devices know to use bandwidth part configuration BWPC5 such as including wireless channels 8, 9, 10, and 12. Each of the communication devices can be configured to request allocation of bandwidth from the multiple channels in bandwidth part configuration BWCP5. In one embodiment, there is no need for the communication management resource 140 to communicate update setting information for bandwidth part configuration BWCP5 because the settings information were previously communicated in processing operation #12.

The communication management resource 140 uses resource elements of resource blocks of the bandwidth part configuration BWPC5 to communicate in the downlink to each of the communication devices. The communication management resource 140 notifies the communication devices of allocated resource blocks or portions of bandwidth part configuration BWPC5 in which the communication devices are scheduled to communicate in uplink to the wireless base station 131.

Figure 11:
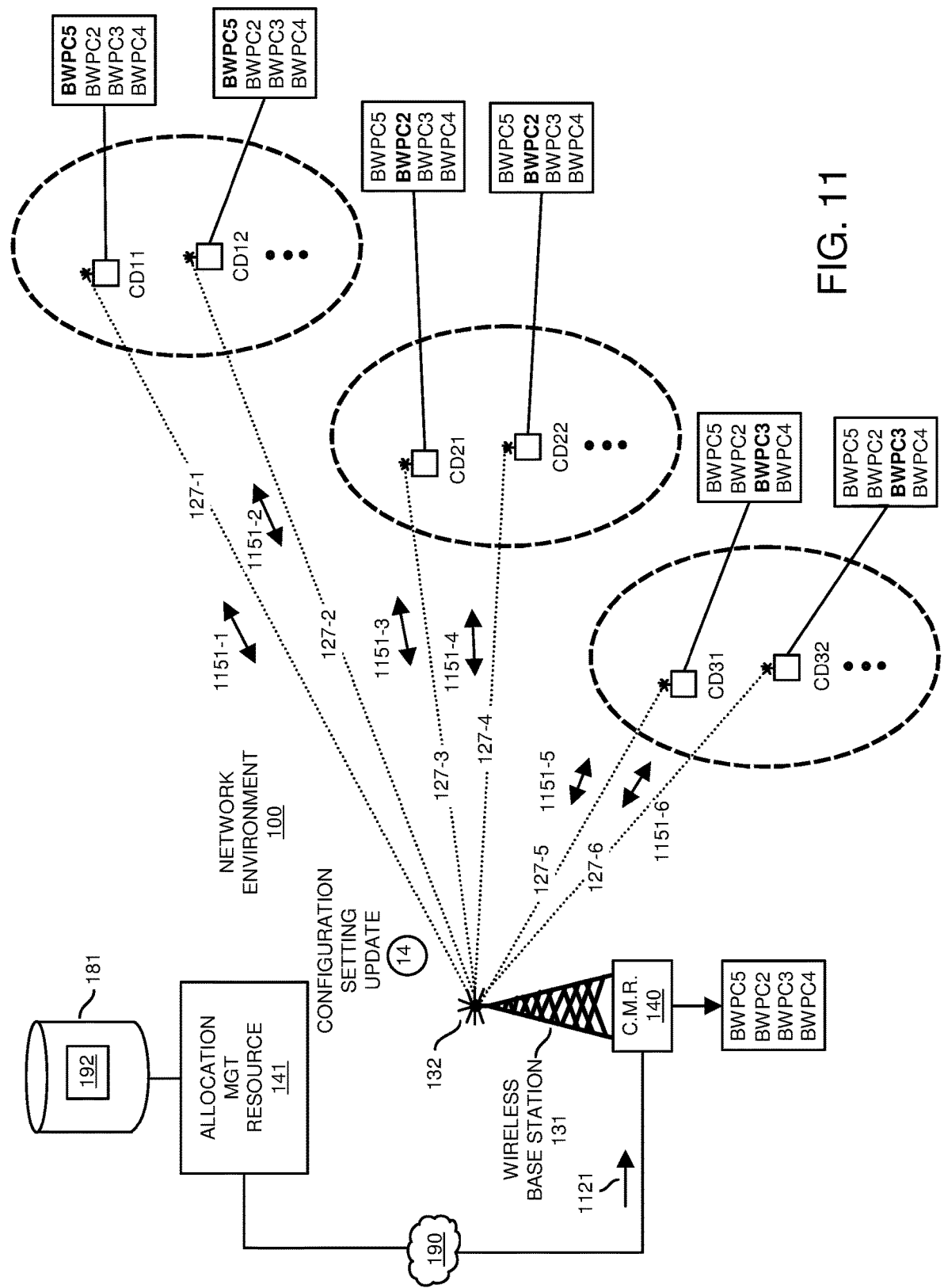
FIG. 11 is an example diagram illustrating selection of different bandwidth part configurations for use by different allocation of a new wireless channel and regeneration of new bandwidth part configuration options based on the allocated wireless channels according to embodiments herein.

FIG. 11 is an example diagram illustrating selection of different bandwidth part configurations for use by different allocation of a new wireless channel and regeneration of new bandwidth part configuration options based on the allocated wireless channels according to embodiments herein.

In this example embodiment, the communication management resource 140 notifies the different sets of communication devices to use different bandwidth part configurations. For example, assume that the allocation management resource 140 continues to allocate wireless channels wireless channels 8, 9, 10, and 12 via heartbeat communications 1121. In processing operation #14, the communication management resource 140 notifies the communication devices CD11, CD12, etc., to use bandwidth part configuration BWPC5; the communication management resource 140 notifies the communication devices CD21, CD22, etc., to use bandwidth part configuration BWPC2; the communication management resource 140 notifies the communication devices CD31, CD32, etc., to use bandwidth part configuration BWPC3; and so on. Thus, different communication devices can be assigned use of different bandwidth part configurations.

Figure 12:
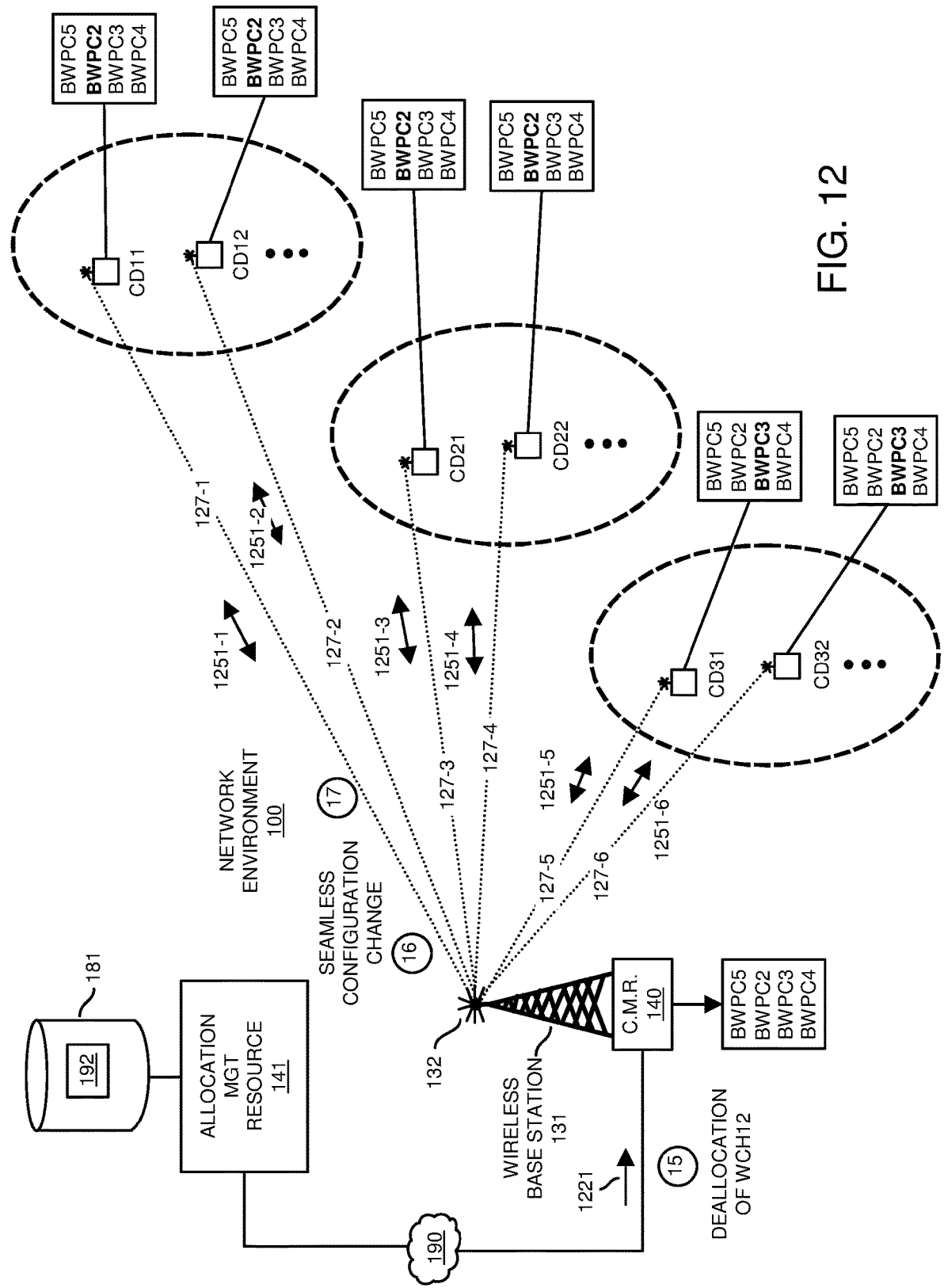
FIG. 12 is an example diagram illustrating seamless switchover to implementing an alternative bandwidth part configuration according to embodiments herein.

FIG. 12 is an example diagram illustrating seamless switchover to implementing an alternative bandwidth part configuration according to embodiments herein.

Via communications 1221, in processing operation #15, the wireless base station 131 and corresponding communication management resource 140 receive notification that a portion of the previously allocated wireless channels have been revoked. For example, assume that the communications 1221 indicate that wireless channel 12 is no longer available for use. This means that the communication management resource 140 and corresponding communication devices are unable to continue to use bandwidth part configuration BWPC5 to support wireless spectrum communications.

In processing operation #16, the communication management resource 140 updates the selection of the bandwidth part configuration to be implemented by the wireless base station 131 and the corresponding communication devices. For example, because bandwidth part configuration BWPC5 is no longer available for use and because it relies on use of revoked wireless channel #12, the communication management resource 140 selects the bandwidth part configuration BWPC2 to support wireless communications in the network environment 100.

In accordance with the selection of bandwidth part configuration BWPC2, the communication management resource 140 communicates a notification to each of the communication devices CD11, CD12, . . . , to discontinue use of bandwidth part configuration BWPC5 and use bandwidth part configuration BWPC2 as a substitute. In response to receiving the notification, the communication devices know to use bandwidth part configuration BWPC2 such as including wireless channels 8, 9, and 10 based on prior configurations. Thus, in one embodiment, there is no need for the communication management resource 140 to communicate update setting information for bandwidth part configuration BWCP2 because the settings information was previously communicated in a prior processing operation.

In processing operation #17, the communication management resource 140 uses resource elements of resource blocks of the bandwidth part configuration BWPC2 to communicate in the downlink to each of the communication devices. The communication management resource 140 notifies the communication devices CD11, CD12, . . . , CD21, CD22, . . . , of allocated resource blocks or portions of bandwidth part configuration BWPC2 (such as resource elements in wireless channels 8, 9, 10, and/or 12) in which the communication devices are scheduled to communicate in uplink to the wireless base station 131. The communication management resource 140 notifies the communication devices CD31, CD32, . . . , of allocated resource blocks or portions of bandwidth part configuration BWPC3 (such as resource elements falling wireless channels 9 and 10) in which the communication devices are scheduled to communicate in uplink to the wireless base station 131.

Figure 13:
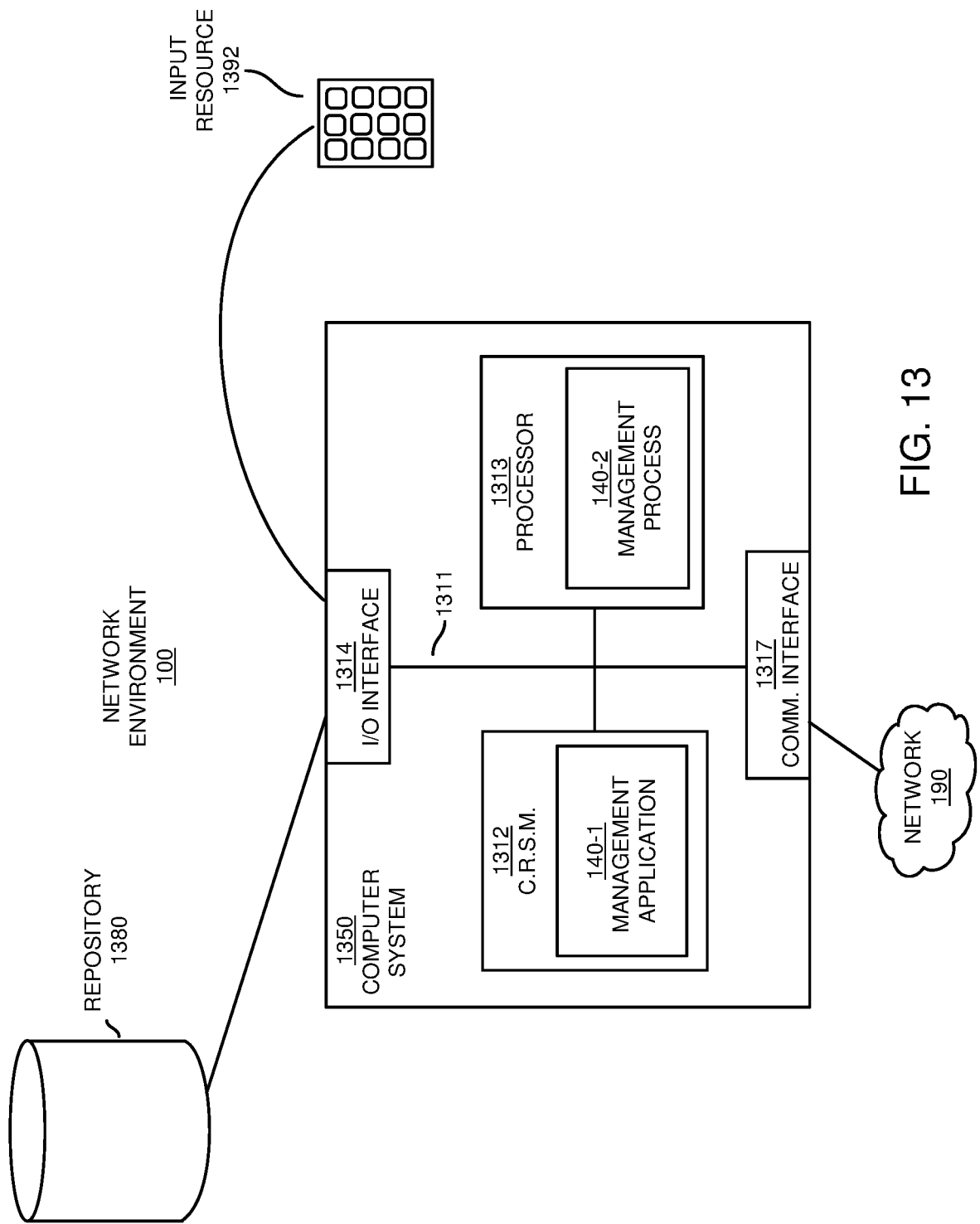
FIG. 13 is an example diagram illustrating example computer architecture operable to execute one or more operations according to embodiments herein.

FIG. 13 is an example block diagram of a computer system for implementing any of the operations as previously discussed according to embodiments herein.

Any of the resources (such as bandwidth monitor 130, communication management resource 140, allocation management resource 141, wireless base station 131, wireless base station 132, communication device CD11, communication device CD12, etc.) as discussed herein can be configured to include computer processor hardware and/or corresponding executable instructions to carry out the different operations as discussed herein.

As shown, computer system 1350 of the present example includes interconnect 1311 coupling computer readable storage media 1312 such as a non-transitory type of media (which can be any suitable type of hardware storage medium in which digital information can be stored and or retrieved), a processor 1313 (computer processor hardware), I/O interface 1314, and a communications interface 1317.

I/O interface(s) 1314 supports connectivity to repository 1380 and input resource 1392.

Computer readable storage medium 1312 can be any hardware storage device such as memory, optical storage, hard drive, floppy disk, etc. In one embodiment, the computer readable storage medium 1312 stores instructions and/or data.

As shown, computer readable storage media 1312 can be encoded with management application 140-1 such as associated with communication management resource 140 or other entity in a respective wireless station to carry out any of the operations as discussed herein.

During operation of one embodiment, processor 1313 accesses computer readable storage media 1312 via the use of interconnect 1311 in order to launch, run, execute, interpret or otherwise perform the instructions in management application 140-1 stored on computer readable storage medium 1312. Execution of the management application 140-1 produces communication management process 140 2 to carry out any of the operations and/or processes as discussed herein.

Those skilled in the art will understand that the computer system 1350 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 1350 may reside at any location or can be included in any suitable resource in any network environment to implement functionality as discussed herein.

Functionality supported by the different resources will now be discussed via flowchart in FIG. 14. Note that the steps in the flowcharts below can be executed in any suitable order.

Figure 14:
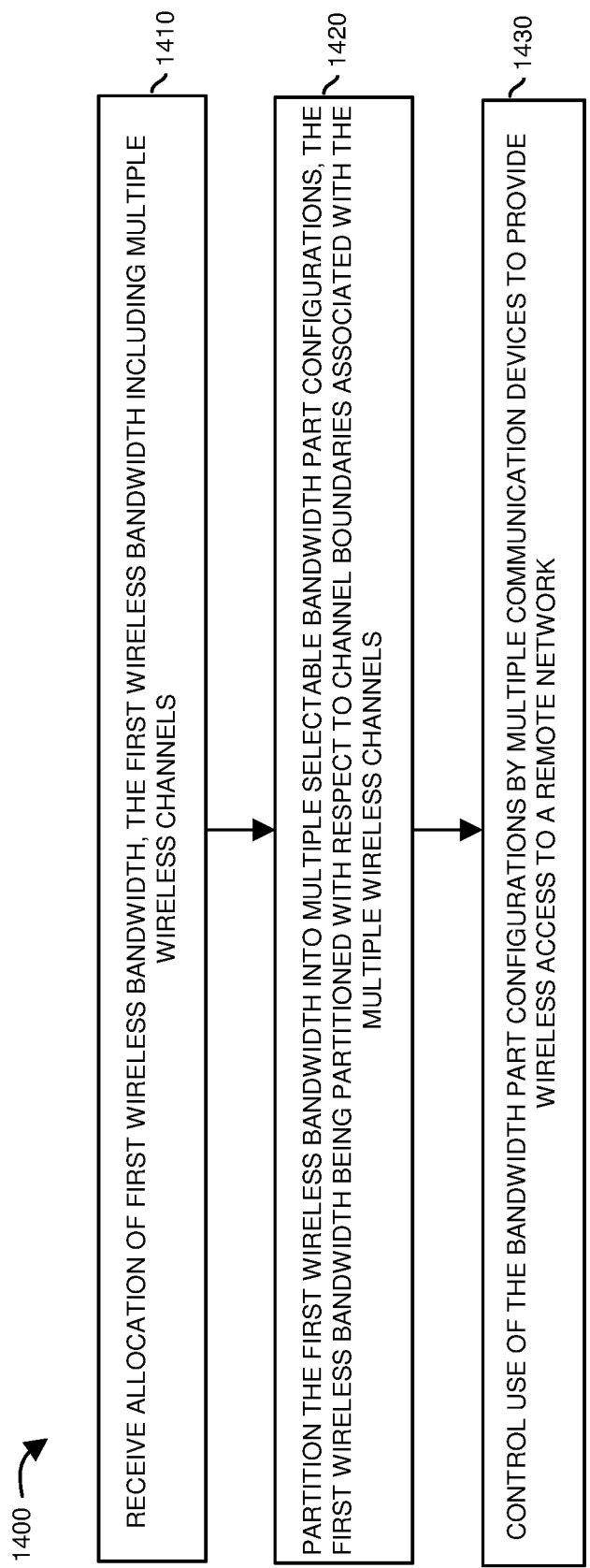
FIG. 14 is an example diagram illustrating methods according to embodiments herein.

FIG. 14 is a flowchart 1400 illustrating an example method according to embodiments herein. Note that there will be some overlap with respect to concepts as discussed above.

In processing operation 1410, the communication management resource 140 receives allocation of first wireless bandwidth such as including multiple wireless channels 7, 8, 9, and 10.

In processing operation 1420, the communication management resource 140 partitions the first wireless bandwidth into multiple selectable bandwidth part configurations such as bandwidth part configuration BWPC1. In one embodiment, the communication management resource 140 partitions the allocated wireless bandwidth with respect to channel boundaries associated with the allocated multiple wireless channels.

In processing operation 1430, the communication management resource 140 controls use of the bandwidth part configurations by multiple wireless stations (such as multiple communication devices) to provide the communication devices wireless access through wireless base station 131 to a remote network 190.

Note again that techniques herein are well suited to facilitate use of a shared wireless channel amongst different types of wireless stations. However, it should be noted that embodiments herein are not limited to use in such applications and that the techniques discussed herein are well suited for other applications as well. Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. A method comprising:
  receiving allocation of first wireless bandwidth, the first wireless bandwidth including multiple wireless channels;
  partitioning the first wireless bandwidth into multiple selectable bandwidth part configurations, the first wireless bandwidth being partitioned with respect to channel boundaries associated with the multiple wireless channels, wherein the multiple selectable bandwidth part configurations include a first bandwidth part configuration and a second bandwidth part configuration, the first bandwidth part configuration including the multiple wireless channels, the second bandwidth part configuration including a less-than-all subset of the multiple wireless channels; and
  controlling use of the multiple selectable bandwidth part configurations by multiple communication devices to provide wireless access to a remote network.

2. The method as in claim 1, wherein controlling use of the multiple selectable bandwidth part configurations includes:
  providing notification of the multiple selectable bandwidth part configurations to each of the multiple communication devices; and
  communicating a respective command to each of the multiple communication devices, the respective command indicating a particular bandwidth part configuration of the multiple bandwidth part configurations to be used by a corresponding communication device receiving the respective command.

3. The method as in claim 1 further comprising:
  notifying a first communication device of the multiple communication devices to implement the first bandwidth part configuration selected amongst the multiple selectable bandwidth part configurations.

4. The method as in claim 1, wherein controlling use of the multiple selectable bandwidth part configurations to provide multiple communication devices access to the remote network includes:
  initially assigning use of the first bandwidth part configuration to a first mobile communication device of the multiple communication devices; and
  in response to receiving notification of revocation of a first wireless channel of the multiple wireless channels, notifying the first mobile communication device to switchover to use of the second bandwidth part configuration.

5. The method as in claim 4, wherein the second bandwidth part configuration excludes the first wireless channel.

6. The method as in claim 1 further comprising:
  scheduling simultaneous use of the first bandwidth part configuration of the multiple selectable bandwidth part configurations by the multiple communication devices.

7. A method comprising:
  receiving allocation of first wireless bandwidth, the first wireless bandwidth including multiple wireless channels;
  partitioning the first wireless bandwidth into multiple selectable bandwidth part configurations, the first wireless bandwidth being partitioned with respect to channel boundaries associated with the multiple wireless channels;
  controlling use of the multiple selectable bandwidth part configurations by multiple communication devices to provide wireless access to a remote network; and
  wherein the multiple wireless channels are allocated from a hierarchical tier of wireless channels in which each of the multiple wireless channels are revocable by an entity having higher priority rights than a service provider receiving the allocation of the first wireless bandwidth for use by the multiple communication devices.

8. The method as in claim 1, wherein controlling use of the multiple selectable bandwidth part configurations to provide multiple communication devices wireless access to the remote network includes communicating a first set of bandwidth part configurations to a first communication device of the multiple communication devices, the method further comprising:
  in response to receiving a change in the allocation of the first wireless bandwidth, producing a second set of bandwidth part configurations.

9. A method comprising:
  receiving allocation of first wireless bandwidth, the first wireless bandwidth including multiple wireless channels;
  partitioning the first wireless bandwidth into multiple selectable bandwidth part configurations, the first wireless bandwidth being partitioned with respect to channel boundaries associated with the multiple wireless channels, the multiple selectable bandwidth part configurations including a first set of bandwidth part configurations; and
  controlling use of the multiple selectable bandwidth part configurations by multiple communication devices to provide wireless access to a remote network;
  wherein controlling use of the multiple selectable bandwidth part configurations includes: during a maintenance window, communicating a second set of bandwidth part configurations to a first communication device, the second set of bandwidth part configurations being a substitute for first bandwidth part configurations.

10. The method as in claim 1, wherein the second bandwidth part configuration overlaps with the first bandwidth part configuration.

11. A method comprising:
  receiving allocation of first wireless bandwidth, the first wireless bandwidth including multiple wireless channels;
  partitioning the first wireless bandwidth into multiple selectable bandwidth part configurations based on anticipation of revocation of a first wireless channel of the multiple wireless channels, the first wireless bandwidth being partitioned with respect to channel boundaries associated with the multiple wireless channels; and
  controlling use of the multiple selectable bandwidth part configurations by multiple communication devices to provide wireless access to a remote network.

12. The method as in claim 1, wherein the multiple wireless channels of the first bandwidth include a set of non-contiguous wireless channels.

13. A system comprising:
  bandwidth management hardware operative to:
    receive allocation of first wireless bandwidth, the first wireless bandwidth including multiple wireless channels;
    partition the first wireless bandwidth into multiple selectable bandwidth part configurations, the first wireless bandwidth being partitioned with respect to channel boundaries associated with the multiple wireless channels;
    control use of the multiple selectable bandwidth part configurations by multiple communication devices to provide wireless access to a remote network; and
    wherein the controlled use includes: initial assignment of use of a first bandwidth part configuration of the multiple selectable bandwidth part configurations to a first communication device of the multiple communication devices; and in response to receiving notification of revocation of a first wireless channel of the multiple wireless channels, communication of a notification to the first communication device, the notification notifying the first communication device to switchover to use of a second bandwidth part configuration of the multiple selectable bandwidth part configurations.

14. The system as in claim 13, wherein the bandwidth management hardware is further operative to:
  provide notification of the multiple selectable bandwidth part configurations to each of the multiple communication devices; and
  communicate a respective command to each of the multiple communication devices, the respective command indicating a particular selectable bandwidth part configuration of the multiple selectable bandwidth part configurations to be used by a corresponding communication device receiving the respective command.

15. The system as in claim 13, wherein the bandwidth management hardware is further operative to:
  notify a first communication device of the multiple communication devices to implement a first bandwidth part configuration selected amongst the multiple selectable bandwidth part configurations.

16. The system as in claim 13, wherein the bandwidth management hardware is further operative to:
  initially assign use of a first bandwidth part configuration of the multiple selectable bandwidth part configurations to a first communication device of the multiple communication devices; and
  in response to receiving notification of revocation of a first wireless channel of the multiple wireless channels, notify the first communication device to switchover to use of a second bandwidth part configuration of the multiple selectable bandwidth part configurations.

17. The system as in claim 16, wherein the second bandwidth part configuration excludes use of the first wireless channel.

18. The system as in claim 13, wherein the bandwidth management hardware is further operative to:
  schedule simultaneous use of a first bandwidth part configuration of the multiple selectable bandwidth part configurations by the multiple communication devices.

19. The system as in claim 13, wherein the selectable bandwidth part configurations include a first bandwidth part configuration and a second bandwidth part configuration, the second bandwidth part configuration including a less-than-all portion of wireless channels assigned for use in the first bandwidth part configuration.

20. The system as in claim 13, wherein the multiple wireless channels are allocated from a hierarchical tier of wireless channels in which each of the multiple wireless channels are revocable by an entity having higher priority rights than the multiple communication devices.

21. The system as in claim 13, wherein the bandwidth management hardware is further operative to:
communicate a first set of bandwidth part configurations to a first communication device of the multiple communication devices, the method further comprising:
in response to receiving a change in the allocation of the first wireless bandwidth, producing a second set of bandwidth part configurations.

22. The system as in claim 21, wherein the bandwidth management hardware is further operative to:
during a maintenance window, communicate the second set of bandwidth part configurations to the first communication device, the second set of bandwidth part configurations being a substitute for the first bandwidth part configurations.

23. The system as in claim 13, wherein a first bandwidth part configuration of the multiple selectable bandwidth part configurations overlaps with a second bandwidth part configuration of the multiple selectable bandwidth part configurations.

24. The system as in claim 14, wherein the bandwidth management hardware is further operative to:
partition the first wireless bandwidth into the multiple selectable bandwidth part configurations based on anticipation of revocation of a first wireless channel of the multiple wireless channels.

25. The system as in claim 13, wherein the multiple wireless channels of the first bandwidth are non-contiguous wireless channels.

26. The method as in claim 1, wherein the multiple wireless channels include a first wireless channel and a second wireless channel.

27. The method as in claim 26, wherein the first bandwidth part configuration includes both the first wireless channel and the second wireless channel;
wherein the second bandwidth part configuration includes the second wireless channel; and
wherein the second bandwidth part configuration excludes the first wireless channel.

28. The method as in claim 27, wherein the second wireless channel is contiguous with the first wireless channel in the first wireless bandwidth.

29. The method as in claim 27, wherein the second wireless channel is non-contiguous with the first wireless channel in the first wireless bandwidth.

30. The method as in claim 1, wherein the first bandwidth part configuration includes a first wireless channel, a second wireless channel, and a third wireless channel; and
wherein the second bandwidth part configuration excludes the first wireless channel but includes the second wireless channel and the third wireless channel.

31. The method as in claim 30, wherein the first wireless channel is excluded from the second bandwidth part configuration in anticipation of the first wireless channel later being used by an entity having higher priority rights to use the first wireless channel than the multiple communication devices.

32. The method as in claim 1, wherein the multiple wireless channels are allocated from a hierarchical tier of wireless channels in which a first wireless channel in the first bandwidth part configuration is revocable by an entity having higher priority rights than the multiple communication devices.

* * * * *